Feb. 20, 1945. W. SCHAELCHLIN ET AL 2,370,078
SYSTEM OF CONTROL FOR ELECTRIC MOTORS
Filed June 8, 1943 2 Sheets-Sheet 1

WITNESSES:
E. A. McCloskey
Birney Hines

INVENTORS
Walter Schaelchlin
and Erling Frisch.
BY
ATTORNEY

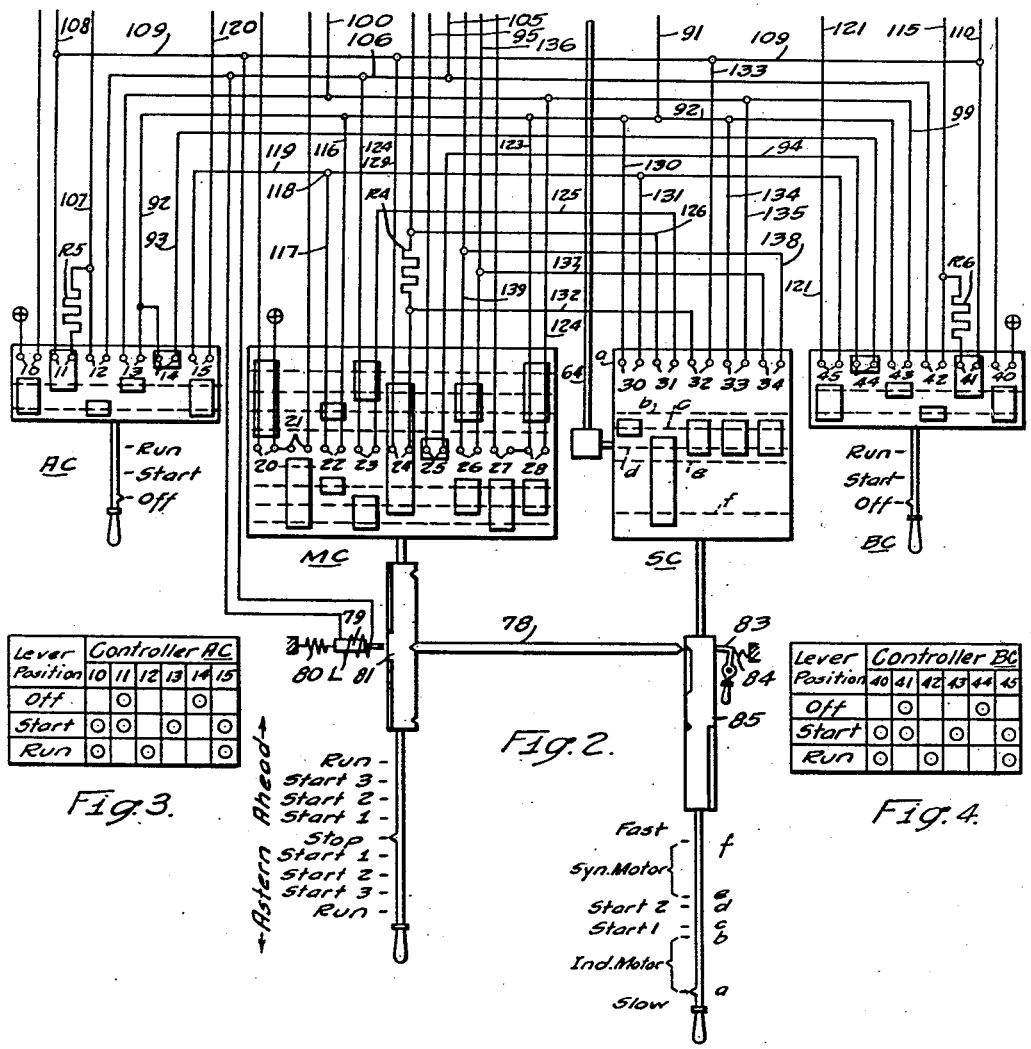

Patented Feb. 20, 1945

2,370,078

UNITED STATES PATENT OFFICE 2,370,078

SYSTEM OF CONTROL FOR ELECTRIC MOTORS

Walter Schaelchlin, Wilkinsburg, and Erling Frisch, Pittsburgh, Pa., assignors to Westinghouse Electric & Manufacturing Company, East Pittsburgh, Pa., a corporation of Pennsylvania Application June 8, 1943, Serial No. 490,038

11 Claims. (Cl. 172—8)

Our invention relates to systems of control for electric motors and, more particularly, to systems of control for ship propulsion motors which are designed to operate as induction motors for low speeds and as synchronous motors for high speeds and which are supplied with power by a plurality of generators driven by a plurality of prime movers.

One object of our invention is to provide a control system of this character which shall require only simple and inexpensive apparatus and which may be easily installed, operated, and maintained in operation.

Another object is to provide a control system which, while simple, may be used to secure more efficient operation of the electrical apparatus served by the system than has heretofore been possible.

Another object is to provide a control system in which the generators may be easily and quickly synchronized.

A further object is to provide a control system in which one lever or operating arm may be used for controlling the whole speed range of synchronous motor operation as well as for induction motor operation.

A still further object is to provide a control system in which the speed of the prime movers during starting may be automatically raised during the starting period to prevent stalling of the engines and to facilitate synchronizing of the generator.

It is also an object of our invention to provide a control system with such locking and interlocking means as will reduce the arcing of the motor starting contactors and prevent the attendant from inadvertently so operating the control system as to produce sub-synchronous speeds.

Although our new control system may be used in controlling the cooperative operation of prime movers, generators, and motors for various purposes, we have, for convenience, illustrated the invention as applied to a ship propulsion system in the accompanying drawings, in which:

Figures 1 and 2 collectively constitute a diagrammatic representation of a ship propulsion system embodying our invention.

Figs. 3 and 4 are sequence tables of the operation of the generator controllers shown in Fig. 1;

Fig. 5 is a sequence table of the operation of the master controller shown in Fig. 1; and Fig. 6 is a sequence table of the operation of the speed controller shown in Fig. 1.

Figure 1:
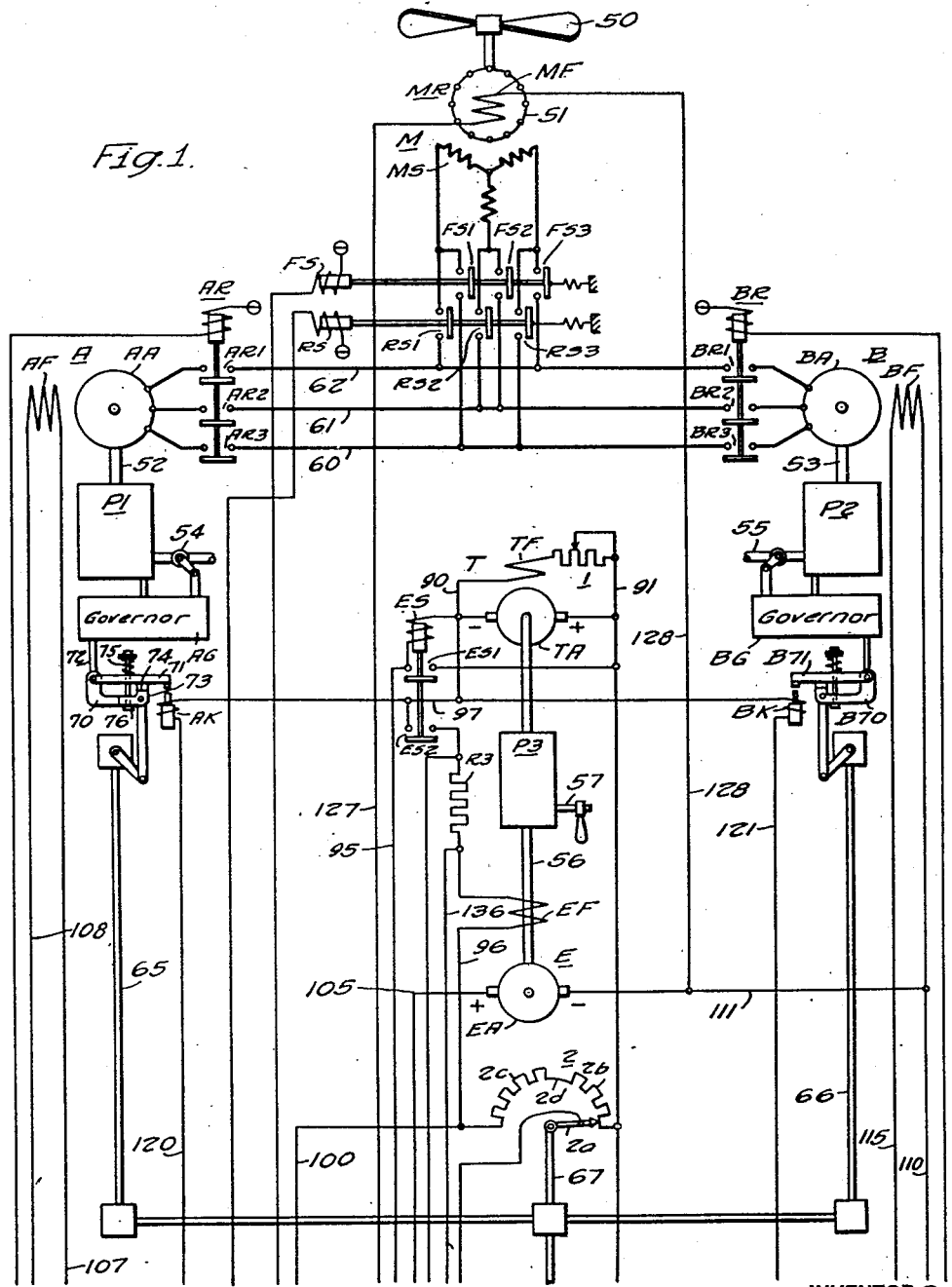

Referring more particularly to the drawings, we have illustrated the invention as used in a ship propulsion system comprising a synchronous motor M for driving a ship propeller 50, a pair of synchronous generators or alternators A and B for supplying alternating-current energy to the motor, a pair of prime movers P1 and P2 for driving the generators, an exciter E for supplying direct current for energizing the field windings of the motor and the generators, a pilot generator T for regulating the supply of energy to the field windings of the exciter, and a prime mover P3 for driving the exciter and the pilot generator at a predetermined constant speed.

The motor M is provided with a stator having a primary winding MS and a rotor having a secondary or induction winding 51 to be used in the conventional manner for variable speed induction motor operation at low speed ranges. The winding 51 may be the usual damper winding or any suitable squirrel-cage winding. The rotor MR is also provided with a field winding MF for synchronous motor operation at the higher speeds. A resistor R4 is provided for controlling the supply of energy in the field winding MF.

The generator A is provided with a field winding AF disposed to be energized by the exciter E and an armature AA disposed to be rotated by the shaft 52 of the prime mover P1. Hence the frequency of the alternating current it supplies to the motor will be determined by the speed of the prime mover. A resistor R5 is disposed in the circuit of the field winding AF to provide a discharge circuit therefor. The generator B is similar to the generator A and is provided with a field winding BF to be energized by the exciter E and an armature BA disposed to be rotated by the shaft 53 of the prime mover P2.

The prime mover P1 may be an internal combustion engine of any suitable type, such as a Diesel engine, and may be controlled through the operation of a valve 54 operated by a speed governor AG. When the governor is set for any selected stable speed, it will control the valve 54 automatically to maintain that speed. The prime mover P2 is similar to the prime mover P1 and its speed is controlled by the operation of its valve 55 through its governor BG in the same manner as the prime mover P1.

The exciter E is provided with an armature EA and a field winding EF. Its armature is mounted on and rotated by the shaft 56 of the prime mover P3 which may be an internal combustion engine of any suitable type, such as a Diesel engine, and which operates at a constant speed determined by its fuel supply through an adjustable valve 57. In addition to supplying direct current to the field windings of the motor and the generators, the exciter E supplies current for operation of the control apparatus for the system as a whole. A rheostat 2 and a resistor R3 are disposed in the circuit for the exciter field windings for the purpose of controlling the value of the current supplied by the exciter to the motor and the generator field windings.

The pilot generator T is provided with an armature TA and a field winding TF disposed in shunt relation to the armature. The armature is mounted on the shaft 56 of the prime mover P2. The brushes of the armature TA are electrically connected to the field windings EF of the exciter E so that the operation of the pilot generator causes it to supply direct-current energy to the field windings of the exciter. A manually operated rheostat 1 is disposed in the circuit of the pilot generator field windings TF for adjusting the excitation thereof to the desired value.

A controller AC of the face plate type operated by a lever is illustrated for controlling the energization of the field windings of the generator A and for operating a contactor AR to connect its rotor to the bus bars 60, 61 and 62 used to connect the generators in circuit with each other and with the motor M. A similar controller BC is provided for controlling the energization of the generator B and for operating a contactor BR to connect its rotor to the bus bars 60, 61 and 62.

A master controller MC of the face plate type operated by a motor lever is provided for starting, stopping and reversing the motor and for preparing the circuits of the motor, the pilot generator, the exciter and the generators for operation.

A speed controller SC, also of the face plate type operated by a speed lever is provided for controlling the speed of the motor and its operation as an induction motor while running at very low speeds and as a synchronous motor at higher speeds. It effects the changes in speed of the motor partly by moving contact segments to control certain circuits and partly by mechanically operating a transmitter 64 to change the speed of the Diesel engines P1 and P2 during synchronous motor operation and to change the setting of the rheostat 2. Although the transmitter is illustrated as of the gear type, it may be of the hydraulic type or any other suitable type.

The transmitter arm 65 is connected to the operating shaft 72 of the governor AG by means of a bell crank lever 70 and a straight lever arm 71, so that movement of the transmitter arm 65 by the controller SC will change the setting of the governor and thus change the speed of the engine, but a solenoid operated plunger AK is provided for operating the lever 71 independently of the transmitter arm for temporarily raising the speed of the engine during starting operations to prevent stalling of the engine during such starting operations.

One end of the arm 70 is rotatably mounted on the outer end of the governor shaft 72 and its other end is pivotally attached to the transmitter arm 65. One end of the arm 71 is fixed on the shaft 72 adjacent to the arm 70, and its other end extends outwardly adjacent thereto. The arm 70 is provided with a projection 73 disposed to engage a cooperating projection 74 on the arm 71 and thereby move that arm with it to rotate the shaft 72 when the arm 70 is moved in anticlockwise direction. A compression spring 75 is disposed between the upper face of the arm 70 and the upper end of a bolt 76 pivotally mounted in the arm 70 for the purpose of biasing the arm 71 against the arm 70 so that the two arms will normally move as one but permitting the arms 71 to move ahead of the arm 70 a distance corresponding to the compression of the spring 75. With this arrangement, movement of the transmitter 65 will move the arm 70 and hence the arm 71 to rotate the governor shaft 72, but the arm 71 may be moved to rotate the shaft 72 independently of the arm 70.

The solenoid operated plunger AK is electrically connected to the contacts 22 on the master controller so as to be energized when the motor lever is in its start 2 position and it is also electrically connected to the contacts 30 on the speed controller so as to be energized when the speed lever is in its start 1 position. Thus the plunger will raise the engine speed temporarily if the motor lever is moved to start the motor while the speed lever is in its low synchronous position, or if the motor lever is in its run position and the speed lever is moved from its induction motor position to its synchronous position, thereby providing a means for temporarily and automatically raising the engine speed to prevent stalling whenever the motor is started into synchronous operation. When the solenoid is deenergized, the spring 75 returns the lever 71 to its biased position against the lever 70 and the engine is again controlled only by the operation of the transmitter arm 65.

The transmitter arm 67 is connected to the governor BG of the generator B in a similar manner by a speed control receiver having a pair of levers B70 and B71 and a solenoid operated plunger BK for raising the speed of the engine P2 during starting or reversing operations of the motor in a manner similar to that described for the engine P1.

The transmitter arm 67 for operating the rheostat 2 is so connected to the controller SC that it moves the arm 2a in accordance with the movement of the controller. The contacts engaged by the arm 2a are so disposed that the resistance included in the generator field windings of the exciter during movement of the speed lever to increase the speed of the motor decreases gradually while the motor acts as an induction motor, then stays constant during operation of the speed lever over start 1 and start 2 to cause synchronous operation of the motor and then again decreases gradually as the lever is moved toward full speed position in order to strengthen the field of the motor. While the controllers are illustrated as of the face plate type, it is to be understood that any suitable controllers of the drum type or mechanical switches controlled by drum controllers may be used in place of the face plate controllers.

A mechanical interlock 78 is disposed between the motor lever MC and the speed lever SC to prevent movement of the motor lever into starting position unless the speed lever is in its lowest synchronous motor speed position (at e on its scale) or in any induction motor position (at a—b on its scale). (For convenience in reading, the a, b, c, d, e and f indications of the position of the speed lever are given at the lever handle, with duplicate markings on the dotted lines on the controller panel.) Conversely, the motor lever cannot be moved out of its forward or reverse running position after operating above its lowest synchronous speed until the speed lever is returned to its low synchronous motor position (e on its scale) or to its induction motor position (a—b on its scale).

A lockout plunger 79 of the solenoid type is provided for preventing movement of the motor lever to its "stop" position and consequent opening of the motor contactors until the excitation of the field windings is reduced to a minimum. A tension spring 80 biases the plunger toward its unlocking position. A magnetizable coil L is provided for moving it into its locking position. The coil is connected across the exciter armature, and the coil and the spring are of such value that when the field windings are over-excited during the motor starting period, the plunger will be pulled into one of the grooves in the motor lever and remain in such groove until the excitation voltage is reduced to near its minimum value. A shoulder 81 disposed on the central position of the motor lever prevents it from being moved to its "off" position while the plunger is in the groove. The groove permits the motor lever to be returned to its start 1 position before being restrained by the plunger and when the field excitation is reduced to nearly its minimum, the plunger will drop out and then the lever can be moved to its "off" position where it deenergizes the motor contactor FS or RS to open the motor circuit.

Thus, the use of the lockout plunger prevents the motor contactors from being opened until the field excitation is reduced so that the arc interrupted by the motor contactors is small and causes little wear on the contacts. Hence, smaller contactors may be used with the aid of the lockout plunger.

Inasmuch as the motor will be run rarely at subsynchronous speeds, we have provided a mechanical latch 83 to prevent the attendant from unintentionally reducing the speed below minimum synchronous value. The latch is biased by a compression spring 84 to engage a shoulder 85 on the speed lever when it is moved from its minimum synchronous speed position toward its induction motor speed position and thereby prevent such movement until the attendant manually releases the latch.

The motor lever, the speed lever and the levers on the generator controllers, may be arranged in a convenient operating stand. After the generators are started by operating the generator control levers, the motor may be started or reversed by operating the motor lever; and its speed throughout its whole range, either as an induction motor or as a synchronous motor, may be controlled by moving only the speed lever to the desired speed position. Thus the motor may be operated either ahead or astern at any speed solely by the use of two levers.

It is believed that the invention may be better understood by the following assumed operation of the apparatus described.

It will be assumed that the Diesel engines P1 and P2 are started in operation and are running at a stable speed suitable for operation of the motor as an induction motor, which speed may be termed the "idling speed;" that the Diesel engine P3 is started and is running at a constant speed for rotating the armatures of the pilot generator T and the exciter E; that the master controller and the generator controllers are in their "off" positions, and that the speed controller is in its lowest synchronous speed position because the motor is usually operated as a synchronous motor and is rarely used as an induction motor.

Under these conditions, the arm 2a of the rheostat 2 will be on the strip between the contacts 2b for induction motor operation and the contacts 2c for synchronous motor operation.

The starting of the engine P3 causes the pilot generator T to supply current to the conductors 90 and 91 for the exciter field winding EF, and inasmuch as the controllers AC and BC are in their "off" positions; and the motor controller is in its stop position; their contacts 14, 44 and 25 are closed and the contactor ES is energized by the circuit TA+, 91, 92, 14, 93, 44, 94, 25, 95, ES, 90, TA—.

The energized contactor ES closes its contacts ES1 to provide a selfholding circuit for itself and closes its contacts ES2 to complete a circuit from the pilot generator to energize the field windings EF of the exciter E, which circuit extends, TA+, 91, 2b, 2d, 2c, 96, EF, R3, ES2, 97, 90, TA—.

The exciter E is now in operation ready to supply an exciting voltage to the field windings of the generators and the motor. The inclusion of the rheostat 2 and the resistor R3 in the circuit for the exciter field windings will keep its excitation at a minimum value.

It will be assumed now that the generator A will be started by moving its controller handle AC directly to its "run" position. In this position its contacts 10, 15 and 12 are closed and its contacts 11, 13 and 14 are open, as shown in the sequence chart Fig. 2. The closed contacts 10 energize the contactor AR to close its contacts AR1, AR2 and AR3 thereby connecting the armature of the generator A to the bus bars 60, 61 and 62. The contacts 11 open to eliminate the discharge resistor R5 from its circulating circuit with the field windings AF of the generator A. The closed contacts 12 connect the field winding AF to the armature of the exciter E by the circuit: EA+, 105, 106, 12, 107, AF, 108, 109, 110, 111, EA—.

The generator A is now operating normally and is connected to the bus bars 60, 61 and 62 and it will be assumed that the generator B is started, connected to the bus bars and synchronized with the generator A. In starting the generator B, the engine P2 is brought to approximately the same speed as the engine P1 and then the controller AC is moved from its "off" position to its "start" position in which it closes its contacts 40, 41, 43 and 45. The closed contacts 40 energize the coil of the contactor BR thereby causing its contacts BR1, BR2, and BR3 to close and connect the armature BA of the generator B to the bus bars 60, 61 and 62 which are energized by the generator A.

The closed contacts 41 keep the starting resistor R6 in its circulatory circuit with the field winding BF of the generator B. The closed contacts 43 complete a short circuit around the rheostat 2 extending from 91, 92, 43, 99, 100, 96.

This short-circuiting of the rheostat 2 increases the excitation of the exciter field winding EF and thus causes the exciter E to raise the excitation of the generator A which is already connected to the bus bars. Consequently, the generator B will now run as an induction motor and it will be forced into near synchronism with the generator A.

It will be assumed now that the controller BC is moved from its "start" position to its "run" position to cause the generator B to synchronize with the generator A. This movement of the controller BC to its "run" position opens its contacts 41 and 43, maintains its contacts 40 and 45 in closed position, and closes its contacts 42. The opening of the contacts 41 eliminates the resistor R6 from its circulatory circuit with the field winding BF. The closing of the contacts 42 closes an energizing circuit for the field windings BF by connecting them directly to the armature of the exciter E, by the circuit: EA+, 105, 106, 42, 115, BF, 116, 111, EA—.

The energization of the field windings BF causes the generator B to fall into step with the generator A and they will continue to operate in this synchronous condition. The opening of the contacts 43 removes the short circuit around the rheostat 2 thus decreasing the excitation of the exciter field windings EF which, in turn, causes the exciter to reduce the value of its excitation voltage for the generators A and B.

The generators A and B are now operating in synchronism, the engines P1 and P2 are running at their stable speed and the speed lever is at its lowest speed position for synchronous motor operation (indicated by d on its scale).

It will be assumed now that the motor is started by moving its control lever MC from its "off" position successively to its start 1, start 2, start 3, and "run" position for "ahead" operation.

The movement of the control lever MC to its start 1 position opens its contacts 25 and closes its contacts 21. The opening of the contacts 25 opens the energizing circuit for the contactor ES but that contactor remains closed because of its self-holding circuit through its contacts ES1. The closing of the contacts 21 energizes the "ahead" contactor FS to close its contacts FS1, FS2, and FS3, thereby connecting the armature or primary windings MS of the motor M to the bus bars 60, 61 and 62 to which the generators are already connected. Thus, current now flows through the windings MS. Inasmuch as the contacts 26, 28 and 27 of the motor controller and the contacts 33 and 34 of the speed controller are open, the generator excitation voltage is low and, consequently, the inrush current to the motor armature will be at a minimum in this first position for starting.

The motor controller is stopped only momentarily in its start 1 position and is now moved to its start 2 position where it also closes its contacts 22, 26, 27 and 28. The closing of the contacts 22 energizes the governor solenoids AK and BK by the circuits:

TA+, 91, 92, 116, 22, 117, to 118 where it divides, one branch extending 119, 15, 120, AK, 97, 90, TA—, and the other branch extending 118, 119, 45, 121, BK, 97, 90, TA—. The energized solenoids AK and BK raise the levers 71 and B71 thereby increasing the speed of the engines P1 and P2 so that they will not stall during this starting period. This is effected without changing the position of the speed control levers 70 and B70.

The closing of the contacts 26 shorts out the resistor R3. The closing of the contacts 27 and 28 shorts out the rheostat 2 by the circuit 92, 123, 28, 124, 99, 100. The short circuiting of the rheostat 2 and the resistor R3 eliminates the resistance in the circuit of the field windings EF of the exciter so that the excitation voltage now produced by the exciter for the generators will rise to its maximum. Consequently, the motor now starts as a squirrel cage induction motor and its speed increases gradually until it reaches a nearly synchronous speed.

After hesitating in the start 2 position until the motor reaches nearly synchronous speed, the motor lever is now moved to its start 3 position where it opens its contacts 22 and closes its contacts 23. The opening of the contacts 22 deenergizes the solenoids AK and BK so that they permit the levers 71 and B71 to return under the pressure of their springs to their normal positions against the levers 70 and B70, thus reducing the speed of the engines P1 and P2 to their normal stable rate. The closing of the contacts 23 energizes the motor field windings MF by the circuit: EA+, 105, 106, 124, 23, 125, 31, 126, 127, MF, 128, 111, EA—.

The motor, as a result of the energization of the field windings MF, pulls into synchronism and runs as a synchronous motor. The reduction in speed of the engines P1 and P2 when the solenoids AK and BK were deenergized reduced the generator speed and thus greatly facilitated the synchronous action, as the motor and the generators will run momentarily at synchronous speed at the same time that the field windings MF become energized.

After hesitating in the start 3 position, the motor lever is advanced to the "run" position, thus opening its contacts 24, 26 and 28. The opening of the contacts 24 opens the circuit for the starting resistor R4. The opening of the contacts 26 and 28 restores the rheostat 2 to the circuit of the exciter field windings EF and thus reduces the value of the excitation voltage supplied by the exciter E to the generators and the motor.

Assuming now that the attendant desires to operate the motor at higher synchronous speed, he effects this result by moving the speed lever forward from its lowest synchronous speed position (e) toward its "fast" position and thereby causes the transmitter arms 65 and 6" to operate the governors AG and BG to increase the speed of the engines P1 and P2. The motor will increase its speed in accordance with the increase in speed of the engines until the maximum synchronous speed is reached. At the same time, the movement of the speed lever causes the transmitter arm 67 to turn the rheostat arm 2a in counter-clockwise direction and thus decrease the amount of resistance in the circuit of the exciter field windings EG which, in turn, causes the exciter E to increase the value of the excitation for the motor and the generators thereby maintaining the stability of the operation and preventing the motor from pulling out of step.

It will be assumed now that the attendant desires to operate the ship (not shown) at its lowest speed and therefore releases the latch A3 and moves the speed lever back to its lowest speed position for induction motor operation. This movement of the speed lever closes its contacts 31 and leaves its contacts 30, 32, 33 and 34 in open condition. The opening of the contacts 31 deenergizes the field windings MF of the motor M, and it ceases to operate as a synchronous motor and begins operating as an induction motor. The movement of the speed lever to its low speed position for induction motor operation also causes the transmitter arm 67 to return the rheostat arm 2a in clockwise direction to its starting point, where it includes the resistance of the rheostat in the circuit of the exciter field windings EF which, in turn, reduces the excitation provided by the exciter for the generators. The motor now operates at its lowest induction speed.

It will be assumed now that the attendant desires to increase the speed of the motor from its lowest induction motor speed to its highest induction motor speed and, therefore, moves the speed lever SC forward to its highest point for induction motor operation, as at b on its scale. This movement fails to cause any effect by the operation of the transmitter arms 65 and 66, because they are so connected as not to change the position of the governors AG and BG during this movement, and thus the engines P1 and P2 continue to operate at their normal stable speed, but it operates the transmitter arm 67 to turn the rheostat arm 2a in a clockwise direction over the resistor contacts 2b, thereby decreasing the amount of resistance in the exciter field windings EF which, in turn, causes the exciter E to increase the excitation of the generators and thus operate the motor at a higher speed while running as an induction motor.

Assuming now that it is desired to change from induction motor operation to synchronous motor operation in order to obtain a higher speed, the attendant moves the speed lever forward successively to its start 1 position (c), its start 2 (d) and then to (e) its lowest speed position for synchronous motor operation, hesitating slightly at each notch.

The movement of the speed lever to its start 1 position closes its contacts 30, 32, 33 and 34. The closing of the contacts 30 energizes the solenoids AK and BK by the circuit:

TA+, 91, 92, 130, 30, 131, 119, one branch extending 15, 120, AK, 97, 90, TA—, and the other branch extending 119, 45, 121, BK, 97, 90, TA—.

The energized solenoids AK and BK operate the governors to raise the speed of the engines P1 and P2 to prevent them from stalling as the motor goes into synchronous operation.

The closing of the contacts 32 includes the starting resistor R4 in circulatory circuit with the motor field windings, which circuit extends 32, 132, R4, 127, MF, 128, 111, 110, 109, 133, 32. This use of the starting resistor R4 prepares the motor for the change from induction motor operation to synchronous motor operation. The closing of the contacts 33 short circuits the rheostat 2 by the circuit 91, 92, 134, 33, 135, 99, 100 thereby eliminating the effect of the rheostat 2 from the circuit of the exciter field windings EF. The closing of the contacts 34 short circuits the resistor R3 by the circuit R3, 136, 137, 34, 138, 139, R3 and thereby excludes that resistor from the circuit for the exciter field windings EF. The exclusion of the resistor R3 and the rheostat 2 from the exciter field windings EF increases the excitation of the exciter E which, in turn, raises the excitation of the generators to its maximum in preparing for synchronous operation of the motor.

After hesitating in the start 1 position the speed lever is moved to its start 2 position where it opens its contacts 30 and closes its contacts 31. The opening of the contacts 30 deenergizes the solenoids AK and BK which operate to release the levers 71 and B71 thus returning the engines P1 and P2 to their normal stable speed. The closing of the contacts 31 energizes the motor field windings MF by the circuit: EA+, 105, 106, 124, 23, 125, 31, 126, 127, MF, 128, EA—. The motor will, as a result of the energization of its field windings, be pulled into synchronism and will now run as a synchronous motor. The reduction in speed of the engines P1 and P2, by the deenergization of the solenoids AK and BK, will reduce the generator speed and will thus greatly facilitate the synchronizing action, as the motor and the generators will run momentarily at synchronous speed at the same time that the motor field windings become energized.

The speed lever is now moved into its low synchronous speed position (indicated by e), thus opening its contacts 32, 33 and 34. The opening of the contacts 32 opens a circuit to the starting resistor R4. The opening of the contacts 34 opens a short circuit around the resistor R3 and restores it to the circuit for the exciter field windings, and the opening of the contacts 33 opens the short circuit around the rheostat 2 and restores it to the circuit of the exciter field windings, thereby reducing the excitation of the exciter and causing it to reduce the excitation of the field windings for the generators and the motor, so that the motor will now operate at its lowest synchronous speed.

If it is desired to increase this synchronous speed of the motor, it may be accomplished by moving the speed lever forward toward its high speed position for synchronous operation, thus increasing the speed of the engines P1 and P2, and increasing the excitation of the generators and the motor by operating the rheostat 2, as previously described, when the motor was placed in synchronous operation by first operating the motor lever and then operating the speed lever.

By the foregoing assumed operation of the apparatus, it will be seen that we have provided a simple and effective system for synchronizing the generators; for controlling the whole speed range through synchronous motor operation and induction motor operation by means of one lever; for automatically raising the speed of the engines to prevent stalling during the starting of synchronous motor operation; for reducing the arcing on the motor contactors, and for preventing the attendant from inadvertently going from synchronous operation to induction motor operation.

Although we have illustrated and described only one specific embodiment of our invention, it is to be understood that many changes therein and modifications thereof may be made without departing from the spirit and scope of the invention.

We claim as our invention:

1. In a control system, a motor provided with primary windings and secondary windings for induction motor operation and field windings connected to a starting resistor for synchronous motor operation, a first generator and a second generator, each having an armature and a field winding, a prime mover for each generator, means for causing the prime mover of the first generator to operate at a predetermined speed, a plurality of bus bars for the generators and the motor, a controller for each of the generators, means responsive to movement of the controller for the first generator to its "run" position for energizing the field windings of that generator and for connecting its armature to the bus bars, means for causing the prime mover of the second generator to operate at the speed of the prime mover for the first generator, means responsive to movement of the controller for the second generator to its start position for increasing the excitation of the first generator and connecting the field winding of the second generator in a circulatory circuit with a starting resistor and for connecting its armature to the bus bars to cause it to operate as an induction motor and forcing it into near synchronism with the first generator, means responsive to movement of the second generator controller from its start position to its "run" position for disconnecting the field winding of the second generator from its starting resistor and for connecting it in shunt relation with the field winding of the first generator and for reducing the excitation of the generator field windings thereby causing the second generator to pull into synchronism with the first generator, a speed controller for the motor, a controller for the motor, means responsive to movement of the motor controller from its off position to a start position for connecting the primary windings of the motor to the bus bars and for reducing the generator excitation, means responsive to movement of the motor controller to another start position and to the position of the speed lever in its low speed synchronous position for increasing the generator excitation to a maximum and for increasing the speed of the prime movers to prevent their stalling to start the motor as an induction motor, means responsive to movement of the motor controller to a third start position for decreasing the speed of the prime movers and for energizing the motor field windings to cause the motor to pull into synchronous motor operation, means responsive to movement of the motor controller to its "run" position for reducing the excitation of the field windings and for disconnecting the motor field windings from their starting resistor, means responsive to movement of the speed controller from low synchronous speed position toward high synchronous speed position for increasing the speed of the prime movers and the excitation of the field windings of the generators and the motor to increase the speed of the motor, interlocking means between the motor controller and the speed controller for preventing operation of the motor controller from its off position except when the speed controller is in its position for induction motor operation or in its position for low synchronous speed operation, means responsive to movement of the speed controller from its position for synchronous motor operation to its position for induction motor operation while the motor controller is in its "run" position for deenergizing the motor field windings to cause the motor to act as an induction motor, a manually releasable lock for preventing inadvertent movement of the speed controller from its synchronous speed position to its induction motor position, and a locking means on the motor controller responsive to a predetermined excitation of the field windings for preventing movement of the motor controller from its first start position to its off position until the said excitation is reduced to its minimum value.

2. In a control system, a motor provided with windings for induction motor operation and for synchronous motor operation, a first generator and a second generator, each having an armature and a field winding, a prime mover for each generator, means for causing each prime mover to operate at a predetermined speed, a plurality of bus bars for the generators and the motor, a controller for each of the generators, means responsive to movement of the controller for the first generator to its "run" position for energizing the field windings of that generator and for connecting its armature to the bus bars, means for causing the prime mover of the second generator to operate at the speed of the prime mover for the first generator, means responsive to movement of the controller for the second generator to its start position for increasing the excitation of the first generator and connecting the field windings of the second generator with a starting resistor and for connecting its armature to the bus bars to cause it to operate as an induction motor and forcing it into near synchronism with the first generator, means responsive to movement of the second generator controller from its start position to its "run" position for disconnecting the field winding of the second generator from its starting resistor and for connecting it in shunt relation with the field winding of the first generator and for reducing the excitation of the generator field windings to cause the generators to operate in synchronism, a controller for the motor, means responsive to movement of the motor controller from its off position successively through its start positions to its "run" position for first connecting the motor to the bus bars and causing it to operate as an induction motor and for then energizing its field winding to cause it to operate as a synchronous motor, and means responsive to a predetermined excitation of the field windings for locking the motor controller against movement to its off position until the excitation of the field windings is decreased to a predetermined value.

3. In a control system, a motor provided with windings for induction motor operation and for synchronous motor operation, a plurality of generators, a prime mover for each generator, means for causing each prime mover to operate at a predetermined speed, a plurality of bus bars for the generators and the motor, a controller for each of the generators, means responsive to movement of the generator controllers for connecting the armatures of the generators to the bus bars and for energizing the field windings of the generators, a controller for the motor, means responsive to movement of the motor controller from its off position to a start position for connecting the motor to the bus bars, means responsive to movement of the motor controller through another start position for starting the motor as an induction motor and for temporarily increasing the speed of the prime movers to prevent their stalling while the motor is starting, and means responsive to movement of the motor controller to its "run" position for causing the motor to operate as a synchronous motor.

4. In a control system, a driving motor, a first and a second generator for supplying energy to the motor, each generator having an armature and a field winding, a prime mover for each generator; means for causing the prime mover for the first generator to operate at a predetermined speed, a plurality of bus bars for the generators and the motor, a controller for each of the generators, means responsive to movement of the controller for the first generator to its "run" position for energizing the field windings of that generator and for electrically connecting its armature to the bus bars, means for causing the prime mover of the second generator to operate at the speed of the prime mover for the first generator, means responsive to movement of the controller for the second generator to its start position for increasing the excitation of the first generator and for connecting the field windings of the second generator with a starting resistor and for connecting its armature to the bus bars to cause it to operate as an induction motor and force it into near synchronism with the first generator, means responsive to movement of the second generator controller from its start position to its "run" position for disconnecting the field winding of the second generator from its starting resistor and for connecting it in shunt relation with the field winding of the first generator and to reduce the excitation of the generator field windings to cause the generators to operate in synchronism, a controller for the motor, and means responsive to movement of the motor controller from its off position succcessively through its start positions to its "run" position for first connecting the motor to the bus bars and causing it to operate as an induction motor and for then energizing its field winding to cause it to operate as a synchronous motor.

5. In a control system, a driving motor, a plurality of generators, a plurality of prime movers, one for each generator, a controller for each generator, means responsive to operation of the generator controllers for starting the generators and for connecting them to the bus bars, a motor controller for connecting the motor to the bus bars and starting it in operation, and means responsive to operation of the motor controller in starting the motor for temporarily increasing the speed of the prime movers during the starting operation of the motor.

6. In a control system, a driving motor having induction windings and synchronous field windings, a plurality of generators, a plurality of prime movers, one for each generator, a plurality of bus bars for the motor and the generators, a controller for each generator, means responsive to operation of the generator controllers for connecting them to the bus bars and for connecting their field windings to a source of energy for the excitation of the generators, a motor controller for connecting the motor to the bus bars for induction motor operation and for connecting its field winding to said source of excitation for operation as a synchronous motor, and locking means responsive to a predetermined rate of excitation for the field windings for preventing operation of the motor controller to its "off" position until the excitation falls below said predetermined rate of excitation.

7. In a control system, a driving motor having induction motor windings and synchronous field windings, a plurality of generators, each having an armature and a field winding, a plurality of prime movers, one for each generator disposed to operate at a stable speed, a plurality of bus bars for the motor and the generators, a controller for each generator, means responsive to operation of the generator controllers for connecting their armatures to the bus bars and for connecting their field windings to a source of energy for excitation of the generators, a motor controller for connecting the motor to the bus bars for induction motor operation and for connecting the motor field windings to the source of energy for operation as a synchronous motor and for reversing the direction of operation of the motor, a locking means responsive to a predetermined rate of excitation of the field windings for preventing the motor controller from being returned to its off position until the excitation of the field windings falls below a predetermined value, a speed controller, means responsive to operation of the speed controller after the motor has been placed in operation for changing the speed of the motor during synchronous operation and for causing the motor to change from synchronous motor operation to induction motor operation and for altering the speed of the motor during induction motor operation, and interlocking means disposed between the motor controller and the speed controller for preventing operation of the motor controller unless the speed controller is in its induction motor position or its lowest speed synchronous motor position.

8. In a control system, a driving motor having an induction motor winding and a synchronous motor field winding, a plurality of generators for supplying energy to the motor, a prime mover for each generator, a controller for connecting the motor to the generators and starting it in operation, a speed controller operable through an induction range and a synchronous range, means responsive to operation of the speed controller through its synchronous range after the motor has been placed in operation for altering the synchronous speed of the motor, means responsive to movement of the speed controller from its synchronous range to its induction motor range for causing the motor to run as an induction motor, and a manually releasable lock on the speed controller for preventing inadvertent movement of the speed controller from its synchronous motor range to its induction motor range.

9. In a control system, a driving motor having an induction winding for induction motor operation and a field winding for synchronous motor operation, a plurality of generators for supplying energy for the motor, a prime mover operable at a stable speed for each generator, a motor controller for connecting the motor to the generators and starting it in operation, a speed controller operable through an induction motor range and a synchronous motor range for changing the speed of the motor in either range after it has been started in operation, and means responsive to operation of the speed controller from its induction motor range to its synchronous motor range for temporarily increasing the speed of the prime movers while the motor is moving into synchronous operation.

10. In a control system, a driving motor having an induction winding for induction motor operation and a field winding for synchronous motor operation, a plurality of generators for supplying energy to the motor, a prime mover operable at a stable speed for each generator, a motor controller for connecting the motor to the generators and starting it in operation, means responsive to operation of the motor controller for temporarily increasing the speed of the prime movers when the motor is started, a speed controller operable through an induction motor range and a synchronous motor range for changing the speed of the motor in either range after it is started in operation, and means responsive to operation of the speed controller from its induction motor range to its synchronous motor range for temporarily increasing the speed of the prime movers while the motor is going from induction motor operation to synchronous motor operation.

11. In a control system, a driving motor having an induction winding for induction motor operation and a field winding for synchronous motor operation, a plurality of generators for supplying energy to the motor, a prime mover operable at a stable speed for each generator, a motor controller for connecting the motor to the generators and starting it in operation, means responsive to operation of the motor controller for temporarily increasing the speed of the prime movers when the motor is started, means responsive to operation of the motor controller in placing the motor in operation for increasing the excitation of the generators and the motor, a locking means responsive to a predetermined value of excitation of the generators for preventing the return of the motor controller to its off position until the excitation falls below said predetermined value, a speed controller operable through an induction motor range and a synchronous motor range for changing the speed of the motor in either range after it is started in operation, and means responsive to operation of the speed controller from its induction motor range to its synchronous motor range for temporarily increasing the speed of the prime movers while the motor is going from induction motor operation to synchronous motor operation.

WALTER SCHAELCHLIN.
ERLING FRISCH.